United States Patent [19]

Haymond et al.

[11] Patent Number: 4,987,571
[45] Date of Patent: Jan. 22, 1991

[54] DATA COMMUNICATION SYSTEM WITH PRIORITIZED PERIODIC AND APERIODIC MESSAGES

[75] Inventors: William D. Haymond, Surrey; Roderick J. Sillett, Delta; Robert M. Lukas, Burnaby, all of Canada

[73] Assignee: Motorola, Inc., Schaumburg, Ill.

[21] Appl. No.: 384,611

[22] Filed: Jul. 25, 1989

[51] Int. Cl.$^5$ .............................................. H04J 3/02
[52] U.S. Cl. ................................ 370/85; 370/85.300; 370/85.600; 370/95.300
[58] Field of Search ............... 370/85.2, 85.3, 85.6, 370/85.11, 94.1, 94.2, 95.1, 95.3

[56] References Cited

U.S. PATENT DOCUMENTS

| | | | |
|---|---|---|---|
| 4,352,183 | 9/1982 | Davis | 370/85.2 X |
| 4,516,239 | 5/1985 | Maxemchuk | 370/85 |
| 4,612,637 | 9/1986 | Davis | 370/95.3 |
| 4,646,082 | 2/1987 | Engel et al. | 340/825.54 |
| 4,757,460 | 7/1988 | Bione | 370/94.1 X |

Primary Examiner—Benedict V. Safourek
Assistant Examiner—H. Kizou
Attorney, Agent, or Firm—Donald B. Southard

[57] ABSTRACT

A slotted CSMA contention technique and arrangement is disclosed for use in a radio data communications systems having a central base station/controller and a plurality of remote data terminals operating over inbound and outbound channels. The channels are divided into major frames, which are further divided into minor frames, which in turn are divided into microslots. An arrangement is devised whereby channel access may be prioritized as between periodic and aperiodic messages by advantageously utilizing the occurrence of these microslots so as to give priority to the former while completely eliminating collisions therebetween and, at the same time, optimally controlling the efficiency of the system as a whole.

16 Claims, 4 Drawing Sheets

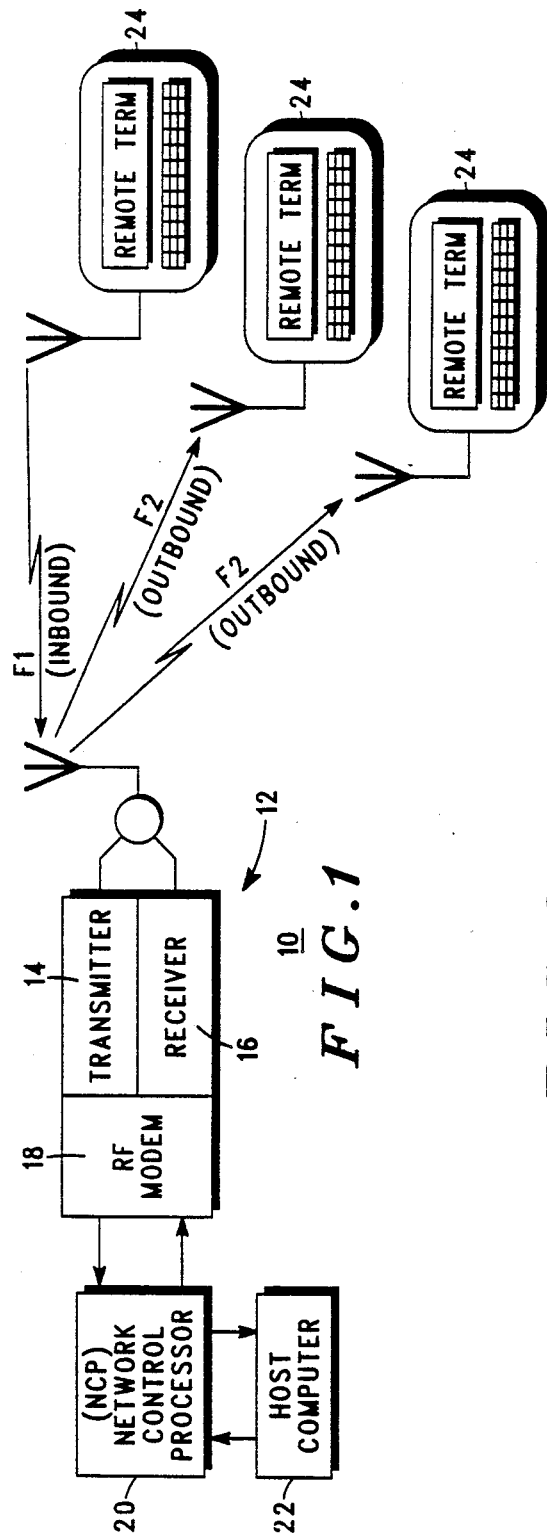
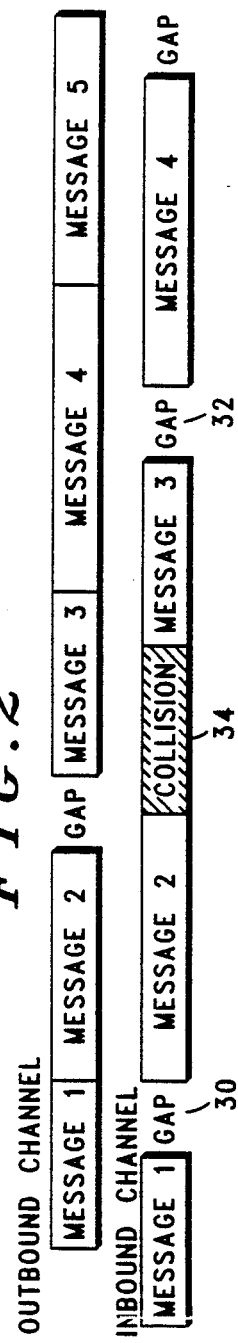
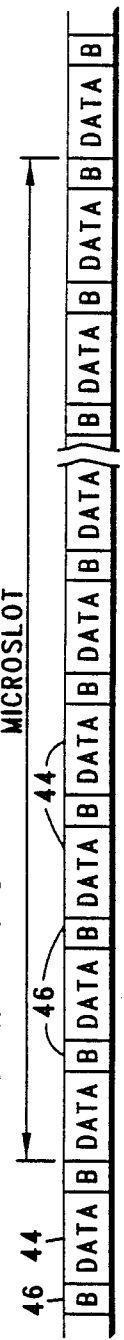

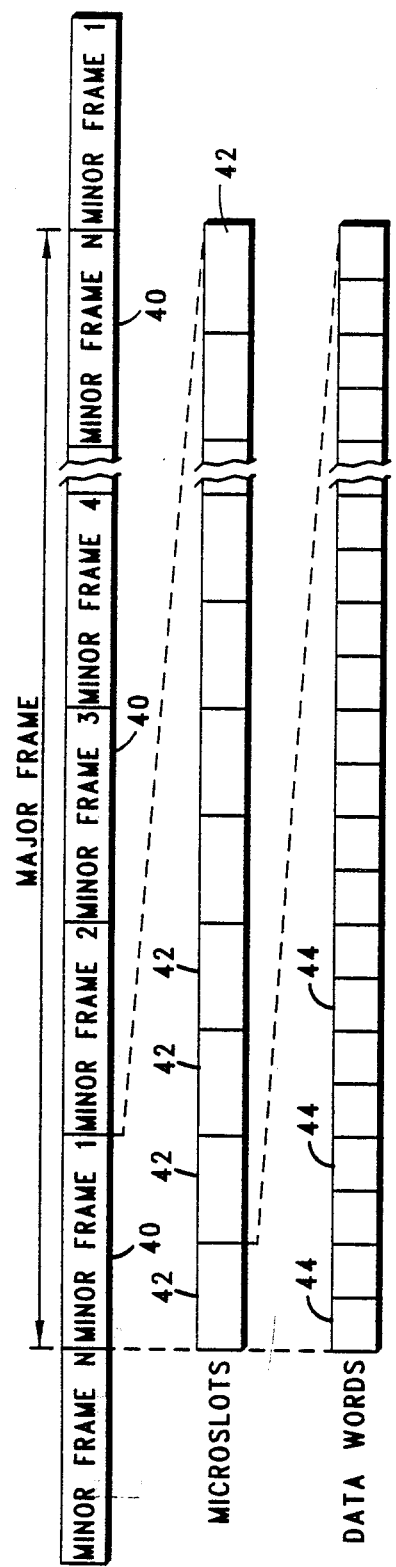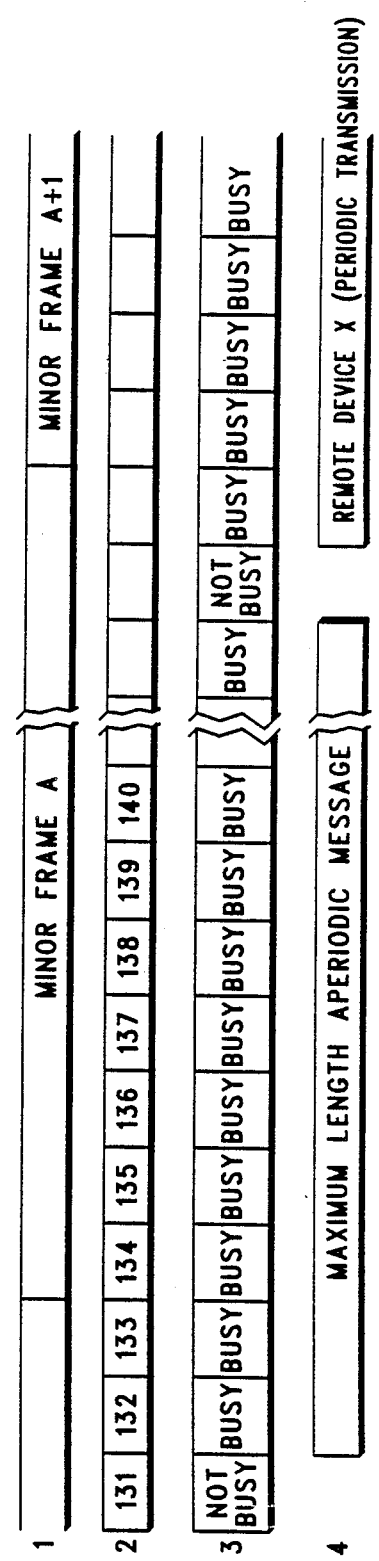

DATA COMMUNICATION SYSTEM WITH PRIORITIZED PERIODIC AND APERIODIC MESSAGES

BACKGROUND OF THE INVENTION

The present invention relates generally to communication systems and, more particularly, to a slotted CSMA communication system arrangement wherein periodic and aperiodic messages are prioritized prior to transmission by a plurality of remote terminal units while eliminating disruptive collisions therebetween.

Communications which process data information are enjoying ever increasing usage. Data only systems are becoming more prevalent but others may accommodate both data and voice. Typically such data systems comprise a base station with full duplex capability, a network control processor (NCP), a system host computer, and a plurality of portable radio data terminals operating essentially in half duplex mode.

In these data systems, suitable channel access protocol techniques are required to minimize interference as between the remote radio data terminals themselves and to keep the system operating at optimum efficiency. Many methods, or protocols, have been developed to address this problem, all with certain advantages and certain disadvantages.

For example, one such protocol that has enjoyed wide-spread application, is known in the art and is commonly referred to in the literature as "non-persistent busy tone (bit) multiple access". In essence, this protocol arrangement permits channel contention between radio data terminals and, when one such terminal gains channel access and begins to transmit data, the central station or controller informs/advises the other terminals in the system of such circumstance by way of setting "inhibit bits" at predetrermined locations or positions in the outbound data stream. When a particular data terminal encounters these inhibit bits, it waits for some period of time, for example, a random time, before contending again for access to the channel. In this way, the system operates with minimum or at least reduced interference and an orderly process is established for all participating data terminals in the system to utilize the available system capacity.

This system control technique, also referred to as slotted CSMA contention protocol, has a number of variations, such as non-persistent slotted CSMA, persistent slotted CSMA, p-persistent slotted CSMA, and virtual time slotted CSMA. In any event, however, this CSMA contention protocol arrangement, and its many variations, effectively schedule transmissions from the remote device population to minimize collisions between messages on the inbound channel and also minimize the unused space between messages. However, such collisions do occur and diminish the efficiency and reliability of the system. Moreover, all such messages are treated equally and the remote unit wishing to transmit, whether it be a reocurring or periodic, message, or simply an aperiodic message, must nevertheless contend for access to the inbound channel with all of the other remote units.

It will be appreciated then, that what is needed is a protocol or traffic control arrangement which includes mechanisms for prioritizing access to the inbound channel so as to prevent these destructive and unwanted collisions between inbound messages, whether they be periodic or aperiodic and to arrange the traffic in such a way that the aperiodic message may be utilized to fill in the gaps between the other or regularly occurring messages being transmitted by the system data terminals on the inbound channel.

SUMMARY OF THE INVENTION

Accordingly, it is an object of the present invention to provide a radio data communication system operating with a channel access protocol wherein the messages transmitted by a plurality of remote units are prioritized as between periodic and aperiodic messages.

A more particular object of the present invention is to provide a radio data communication system of the foregoing type wherein the long periodic messages are temporarily, but selectively assigned to a particular time slot so as to avoid completely collisions between respective periodic messages and wherein collisions between periodic and aperiodic as well as aperiodic to aperiodic are effectively minimized by such prioritization technique as well.

In practicing the invention, a radio data system is provided which utilizes inbound and outbound communication channels and wherein a slotted CSMA contention arrangement is effected as between a plurality of remote radio data terminal units transmitting on the inbound channel, which includes the inbound channel being divided into a plurality of standardized microslots and wherein the outbound channel is adapted to convey the inbound channel busy status information. This system arrangement includes means for effectively prioritizing access to the inbound channel between a mixture of long periodic messages and shorter aperiodic messages. Priority is given to the longer periodic messages on a selectively assigned minor or subframe in a set major frame so that collisions between periodic messages are eliminated completely. Further, additional collisions between such periodic messages and those of an aperiodic nature, or even between the latter, as between themselves, are effectively minimized. Moreover, the long periodic messages are guaranteed access to the channel within a predetermined maximum channel access time; and the efficiency of the system is further optimized by using the shorter aperiodic messages to fill the gaps between the longer periodic messages.

BRIEF DESCRIPTION OF THE DRAWINGS

The features of the present invention which are believed to be novel are set forth with particularity in the appended claims. The invention, itself, however, together with further objects and advantages thereof, may best be understood by reference to the accompanying drawings, in which:

FIG. 1 is a block diagram of a data communication system incorporating the advantageous characteristics of the present invention;

FIG. 2 is a graphic representation of what typical message traffic may be observed on inbound and outbound channels;

FIG. 3 is a graphic representation of the structure of the inbound and outbound channels showing the division into major frames, minor frames, microslots and data words;

FIG. 4 is a graphic representation of the outbound channel at the data word level showing the inclusion of busy status bits interspersed with the data words;

FIG. 7 is a still another time sequence diagram showing both aperiodic and periodic messages being transmitted by remote terminals at the appropriate but permitted time.

BRIEF DESCRIPTION OF THE PREFERRED EMBODIMENT

Figure 5:
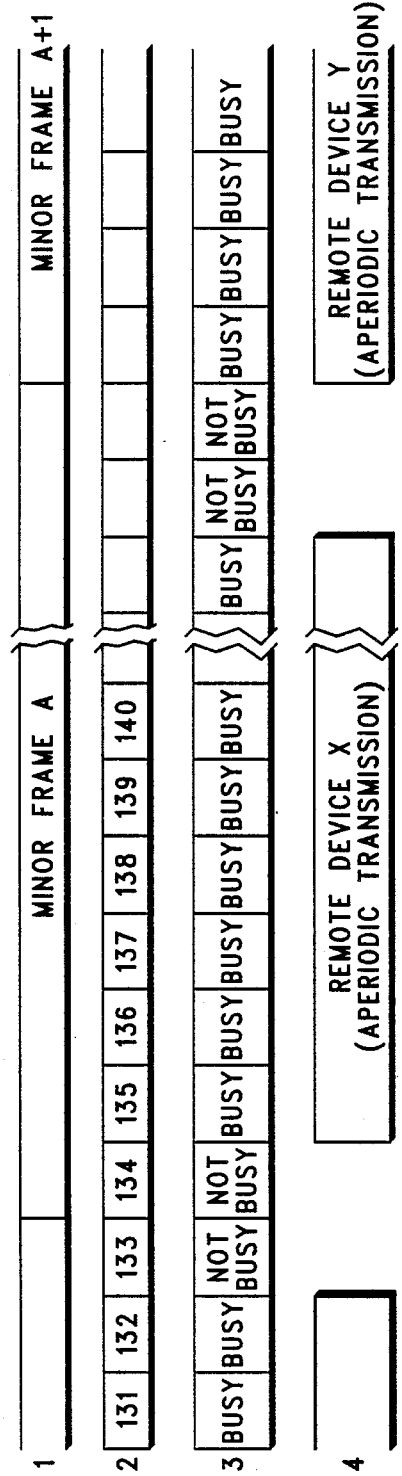
FIG. 5 is a graphic representation of the events by way of example occurring on a time sequence basis for a remote terminal monitoring the outbound channel and transmitting an aperiodic message at the appropriate time.

Referring now to the drawings, a data radio system 10 is referenced in FIG. 1, which may be considered as embodying the advantageous operating characteristics of the present invention. The system has a centrally located base station 12, comprising a transmitter 14 and receiver 16, operating in full duplex mode and which communicates with, by modem 18, and is controlled by a network control processor (NCP) 20. The NCP in turn communicates with the host computer as indicated. A plurality of portable radio data terminals 24 are also part of the system 10, operating in half duplex mode, which receive messages on the outbound channel F2 and transmits messages to the base station 12 on the inbound channel F1.

To manage the data traffic on the referenced communication system 10, of the type described, a channel access protocol must be adopted and applied. The radio data terminals 24 individually seek channel access by transmitting data packets on the inbound channel. The protocol arrangement begins by having the base station/NCP 20 inform/advise the other (and listening) system terminals 24 of this circumstance and by setting busy bits located at predetermined positions in the outbound stream. These bits may be referred to as "inhibit bits" and correspond to a conventional busy tone. If another terminal has a data message to be sent, it first monitors the outbound channel and will sense these inhibit bits when set. Upon such occurrence, the terminal waits a predetermined time (usually random), after which it monitors the channel and retries. This predetermined time is referred to as inhibit delay time and may be set somewhere between 0 and a given time T. At some point, perhaps after repeated attempts, the referenced terminal will find or sense no inhibit bits, indicating the channel is free and will then commence to transmit its intended data message packet.

The graphic representation of radio data traffic operating with the referenced CSMA contention technique is shown in FIG. 2. Messages are shown as occurring on both inbound and outbound channels. Without more, however, it will be noted that, for the inbound channel, there will be gaps between messages, such as indicated at 30 and 32, whenever one radio data terminal has finished transmitting its messages and another terminal has not requested channel access. At other times, more than one data terminal will attempt to transmit its appropriate data packet at the same time to request channel access, resulting in destructive collisions such as represented at reference 34.

The system obviously would be more effective, at least in terms of utilization, if a terminal would transmit its message, when channel access is gained, completely and without interruption. However, for long messages, channel access would then be denied to other contending data terminals for unacceptably long periods of time. On the other hand, the transmitting of such long messages in segments subjects such attempted periodic segment transmission to destructive collisions between those segments and messages of other contending terminal units. Moreover, gaps in message transmissions would still likely occur representing less than full channel utilization. The former represents less than effective traffic control to prevent message collisions and the latter is less than an optimum plan for scheduling of messages.

For any high performance contention technique or protocol to be effective, it will be appreciated, that the system remote data terminals transmitting on the inbound channel must be carefully controlled and coordinated to minimize the gaps between messages that may otherwise occur, as well as preventing any disruptive collisions between any two such remote terminals attempting to transmit at the same time.

A slotted CSMA contention protocol has been developed in accordance with the present invention which advantageously addresses the foregoing problems. In the present arrangement, an effective mechanism is provided for mixing long periodic messages with somewhat shorter aperiodic messages, and wherein the long periodic messages are given priority of transmission over the aperiodic type. Moreover, the aperiodic messages are utilized to more effectively fill in the gaps between such periodic messages to enhance system channel utilization.

In the present system, the inbound and outbound channels are first divided in the time domain into major frames, as illustrated in FIG. 3. Each major frame is then divided into small n minor frames such as indicated at 40. The minor frames are in turn divided into microslots such as shown at 42. Each microslot is then divided further into data words referenced at 44. For the inbound channel, the microslot contains only data words. However, as will be seen in FIG. 4, for the outbound channel the microslot may contain both data words 44 interspersed with busy bits 46.

Accordingly, the various remote radio data terminals 24 are effectively synchronized to these microslots 42 by requiring such remote units 24 to transmit only at the beginning of a particular microslot. The length of the microslot is typically set to be slightly longer in interval than the inherent time delay between a remote data terminal beginning transmission and any other such remote terminal monitoring the outbound channel and noting the busy status indicator go active (presence of busy bits). This synchronization is achieved over the outbound channel by the central base station station/controller, beginning a new outbound message only at the start of a microslot. Since all messages begin with a synchronization bit sequence, this sequence, when received, establishes the basic microslot timing reference. The remote radio data terminals may then keep their own internal timing, which may then be adjusted as required each time an outbound message is achieved.

Since by system design, message transmissions begin only at the start of a microslot 42, and with the microslot length being longer than the time required for the subsequent change in inbound channel status to be reflected in the busy status bits transmitted on the outbound channel, the busy channel status is likely to change during a microslot and is stable only at the end of a microslot. Remote devices 24 must sense busy status at the end of a microslot 42, and ignore busy status bits earlier in the microslot, since there is no relevant information to be gained from the presence of any busy bits at that time. It is important to minimize the possibility of channel errors causing a false busy bit inactive indication, which in turn could result in a remote terminal transmitting when the channel is already busy, and thus colliding both messages. To prevent this, the remote terminal 24 reads the last m busy bits prior to the microslot boundary, and requires that all m busy bits be inactive before the channel is considered to be not busy. It will be noted that if $P_E$ is the probability of a bit error on the channel, then the probability that m busy bits are all in error is $(P_E)^m$. The value of m is a system parameter which is configured based on the expected bit error rate of the outbound channel.

Another important aspect of the present invention is the provision for prioritizing messages. This prioritization is effected between long periodic messages and somewhat shorter in length aperiodic messages. The long message may be considered as one extending in duration longer than one minor frame 40. A message longer than this referenced time period must be split up into segments, each lasting for one minor frame and then transmitted on a regularly occurring time slot. Hence, the reference to the same as a periodic message. Aperiodic messages are those of one minor frame duration or less.

Message priority is achieved by permitting the periodic message transmission to begin at the start of the first microslot 42 after the channel is sensed to be not busy. If the busy status is active at the end of the second microslot, indicating a periodic message transmission has begun elsewhere, the remote terminal desiring to transmit the aperiodic message must reschedule its transmission.

Whether periodic or aperiodic in nature, a message transmission must begin at the start of a microslot boundary when the channel is not busy. For transmitting periodic messages, the only requirement is that the previous microslot show the inbound channel to be not busy. For aperiodic message, having a further requirement is imposed, namely, that there be two consecutive microslot showing a not busy status immediately prior to the start of the transmission of the message.

FIG. 5 shows, as an example, the time sequence of events that may occur for the transmission of an aperiodic message. As illustrated, line 1 indicates the minor frame under consideration; line 2, the number of the microslot; line 3, the status of the so numbered microslots; and line 4, the timing of the referenced messages. Accordingly, a remote device or terminal is shown as actively transmitting a message on the inbound channel during microslots 131 and 132. The busy status indicator appropriately showing a busy status. Shortly after that message ends, the busy status indicator changes state to reflect the availability of the channel. Other remote radio terminals examining the presence of busy bits at the end of microslots 131 and 132 would find them present but would show an absence thereof at the end of microslot 133 and 134, indicating that the channel is not busy. Such remote terminals 24 desiring to transmit aperiodic messages will see two successive microslots with the busy bits inactive and thus free to begin a transmission. In the example of FIG. 5, remote terminal X has a scheduling algorithm which permits the message transmission to begin at the start of microslot 134. Since the message to be transmitted is aperiodic in nature, the remote terminal must wait one further microslot during which the busy status is inactive before transmitting at the start of microslot 135. If microslot 134 had a busy status active indicating that the inbound channel was in fact occupied or busy, then terminal X would be forced to reschedule its transmission to some other time. Also, in FIG. 5, and as by an example, remote terminal Y is shown as beginning transmission at the start of the second microslot following the cessation of transmission by remote terminal X which is also the beginning of minor frame A+1, which is its assigned time slot.

It should be noted that remote terminals transmitting only aperiodic messages need not be aware that the channel is in fact available for periodic message transmission and do not need to synchronize to major frame or minor frame boundaries. On the other hand, very long messages from computers or digitized voice conversations that extend beyond a duration of one minor frame must be divided into segments each one frame long. For the source device, i.e., the base station/controller 12, the effective bit rate over the channel becomes the raw channel rate divided by n, the number of minor frames in a major frame. The advantage of this approach is that while the remote source device is guaranteed periodic channel access and a certain average bit rate over the channel, transmission does not permit access to the channel by others. A number of remote source devices which can gain access to the inbound channel during a major frame in this fashion is simply equal to the number of minor frames per major frame, or n devices. Again as an example, this could permit n users to talk over the channel simultaneously using digital voice. The effect would be similar to using n independent channels, one per voice user. Alternatively, it could permit the same number of computers to access the channel on an equal basis, not one computer blocking other computers from accessing the channel. Periodic message containing digital voice information is time critical in nature, hence periodic messages are given priority over aperiodic messages.

For a remote radio data terminal to transmit a periodic message, it must first transmit an aperiodic data packet or message to the central device requesting permission to transmit a periodic message. The central station/controller 12 responds either negatively or affirmatively with another aperiodic message transmitted over the outbound channel. Assuming the response is affirmative, the aperiodic response message will contain a time stamp which indicates the minor frame being assigned and its location in terms of microslots from the initial aperiodic request. The remote terminal is enabled thereby to count down the microslots as instructed and marks the referenced time accordingly. This time marks the start of the minor frame assigned to that remote device for periodic messages and it will thereafter attempt the periodic transmission in the same manner as an aperiodic transmission with the exception that, instead of using the scheduling algorithm that would otherwise obtain, it begins the transmission on the next microslot after sensing the channel being not busy. The time marked represents the start of the minor frame reserved for that remote terminal. From that single time mark, the remote terminal thereafter knows the start of its minor frame in that major frame and every major frame thereafter and will retain the same until the message is completed and the reserved time slot is thereupon withdrawn for use elsewhere.

Figure 6:
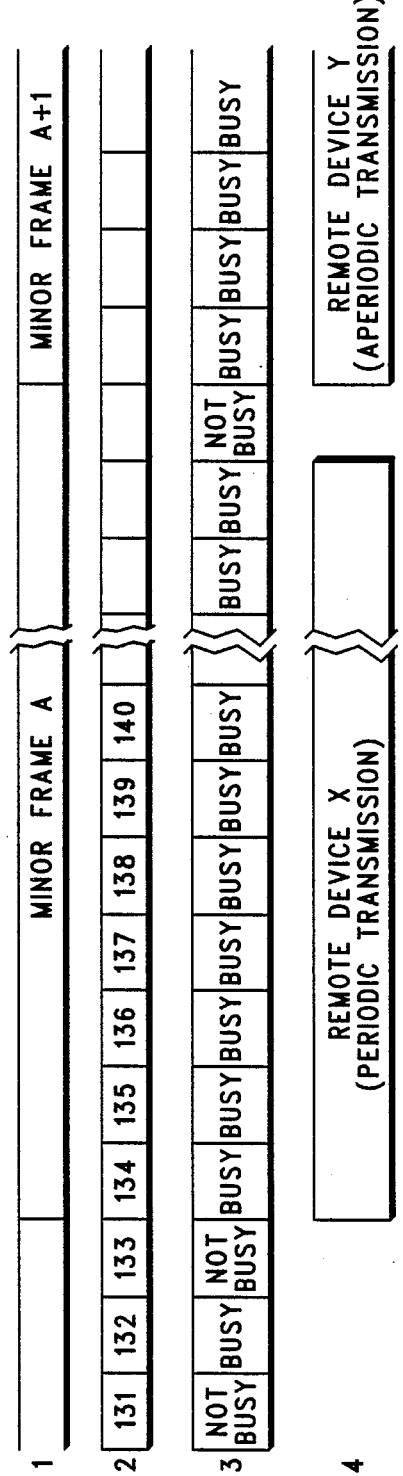
FIG. 6 is a similar time sequence diagram showing inter alia, a remote terminal monitoring the outbound channel and transmitting a periodic transmission at the appropriate time.

FIG. 6 is a graphic representation illustrating the events by way of example that may surround the transmission of a periodic message as initiated by remote terminal X. The central controller 12 gives the remote terminal a time mark which allows it to locate the start of minor frame A, for example, which is assigned to the terminal for periodic transmissions during that time slot for each major frame. This assignment prevents entirely any collisions between periodic transmissions. Since microslot 133 preceding the start of the minor frame A is not busy, remote terminal X may begin its transmission at the start of microslot 134, as indicated. In the example given, the transmission ends one microslot prior to the end of the minor frame A, resulting in the last microslot of the frame showing a not busy status. This permits remote terminal Y, which is assigned minor frame A+1, in the example being considered, to begin its transmission at the start of that referenced frame.

Since no messages are occupying the inbound channel during microslots 131 through 133, it may be possible for an aperiodic message transmission to begin during microslot 134 and collide with the prioritized periodic transmission under consideration. Accordingly, to prevent this, and to give priority to the assigned periodic transmission, the central station/controller 12 sets the channel status to busy during microslot 132, even though the channel is not busy. This effectively prevents an aperiodic message transmission during the duration of microslot 134, but still permits the periodic transmission, and thereby effectively guarantees that a collision between aperiodic and periodic message will in fact not occur.

FIG. 7 is a similar graphic representation intended to illustrate the circumstance in which an aperiodic message transmission may begin in microslot 132, two microslots prior to the start of the assigned minor frame A. This is the last microslot in which a conflicting aperiodic message could begin. In the worst case, an aperiodic message of maximum length, i.e., one minor frame, ends two microslots prior to the start of the next minor frame. This still permits the assigned periodic transmission to begin one microslot prior to the start of the next minor frame, and thereby avoid the collision with another periodic message assigned to the next minor frame. However, it will be noted that it also delays both periodic transmissions by one minor frame less one microslot, which in fact is the maximum delay possible under the present arrangement. If all minor frames are assigned, then all remote terminals transmitting periodic messages will experience this delay until such time as one minor frame becomes free. At that time, the remaining terminals transmitting periodic messages will, in the absence of aperiodic message traffic have an opportunity to begin their transmissions at the start of their assigned minor frame, and the referenced delay no longer is present. In the presence of an aperiodic message traffic, delays obviously then will vary between zero to the maximum delay described hereinabove.

When a remote terminal has completed its sequence of periodic transmission, it transmits a short control message to the central station/controller 12 indicating that it has no further need of the assigned minor frame. At this time, the minor frame is then free to be assigned to some other remote terminal. If this control message is lost or corrupted on the channel, provision is made in the central station/controller to automatically reassign the minor frame if it has not been used for appropriate time period, adjustable, of course, to meet the desired operating conditions.

Figure 8:
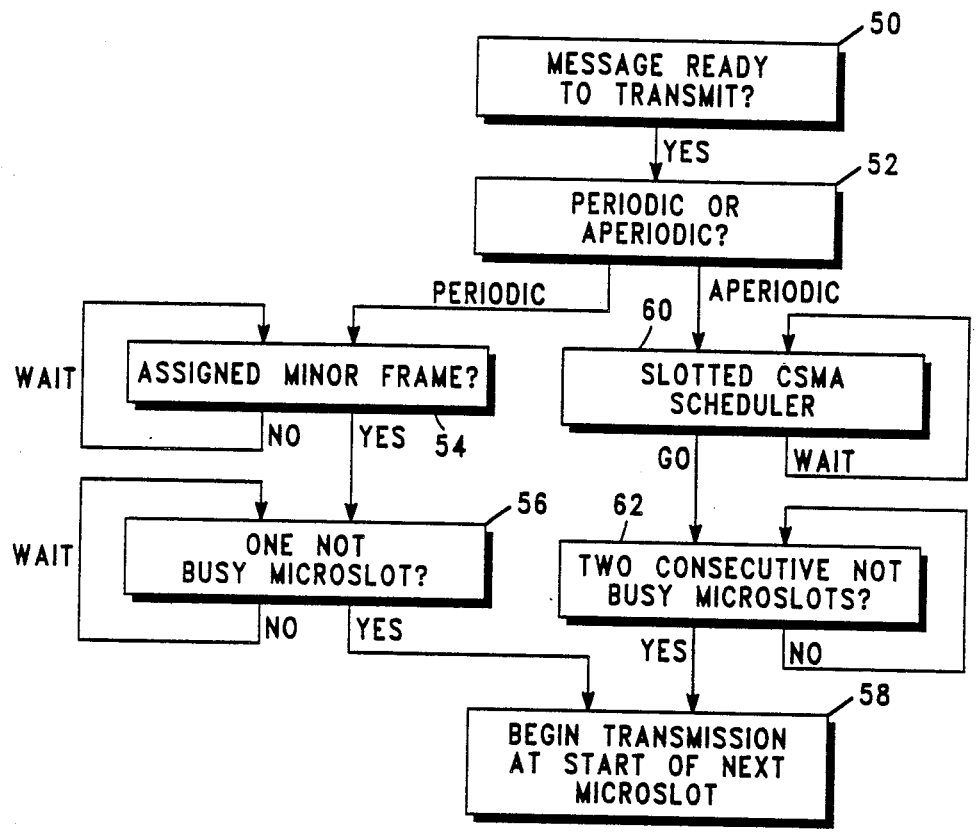
FIG. 8 is a flow chart showing how the periodic and aperiodic messages are handled by a remote terminal unit in accordance with the present invention.

FIG. 8 is a flow chart to indicate in somewhat simplistic form the manner in which periodic and aperiodic messages may be handled by the respective remote radio data terminals 24. When a remote terminal has a periodic message ready to transmit, it waits for its assigned minor frame such as indicated at step 54, after which it must wait again for one not busy microslot at step 56. It may then begin the periodic transmission at the start of the next microslot as shown at step 58.

A remote device with an aperiodic message ready to transmit contends for the channel by transmitting the appropriate data packet after which the CSMA scheduler at step 60, and depending on the nature thereof (nonpersistent, persistent, P-persistent, virtual time, or the like) delays the transmission. At the end of this delay, the remote terminal waits for two consecutive not busy microslots at step 62 and then is permitted to begin its transmission at the start of the next microslot as before at step 58.

Accordingly, in this manner, a radio data communication system is provided with a slotted CSMA protocol arrangement wherein the inbound and outbound channels are divided into frames and microslots and wherein provision is made to effectively prioritize between periodic and aperiodic messages. By the described arrangement herein, the collision between any periodic messages are eliminated completely. Moreover, such collisions between periodic and aperiodic as well as between aperiodic messages themselves are substantially minimized. Further, the aperiodic messages are scheduled in a manner wherein the gaps that would otherwise obtain between the occurrence of messages on the inbound channel are effectively reduced to thereby increase the optimum efficiency of the system as a whole.

Accordingly, what is claimed is:

1. In a data communications system having inbound and outbound communication channels on which a central station and a plurality of remote terminal units operate, a slotted CSMA contention arrangement for selectively controlling the operation of such remote terminal units, comprising in combination:
   said inbound channel being divided into a plurality of standardized microslots of a given duration and wherein said outbound channel is adapted to convey inbound channel busy status information; and
   means for prioritizing access to the inbound channel by the remote units when transmitting periodic and aperiodic messages thereon,
   said remote units being permitted to transmit periodic messages at the start of the first microslot after the inbound channel is sensed not busy, and to transmit aperiodic messages only after waiting an additional one microslot to determine the inbound channel remains not busy.

2. A data communication system in accordance with claim 1 wherein a given number of said microslots form a respective minor frame, a given number of which form a respective major frame.

3. A data communication system in accordance with claim 2 wherein said means for prioritizing channel access includes means for granting sole use of a selected minor frame to a requesting remote terminal for the duration of an on-going periodic message.

4. A data communication system in accordance with claim 3 wherein said request for channel access by a remote terminal to transmit a periodic message is by an aperiodic data message over inbound channel and which is granted by a similar aperiodic message for the outbound channel.

5. A data communication system in accordance with claim 2 wherein said channel access prioritization means further includes means for automatically indicating said inbound channel is busy two microslots prior to the assigned minor frame so as to prevent unwanted acquisition by a radio data terminal transmitting an aperiodic message.

6. A data communication system in accordance with claim 1 which further includes means for synchronizing the remote terminal to the start of an inbound microslot and which further includes means for aligning frame synchronization of the outbound messages with inbound microslots and requiring said remote terminal to synchronize to these sequences and maintain internal timing referenced to said sequences.

7. A data communication system in accordance with claim 2 wherein said inbound channel busy status includes means for providing busy bits interspersed with data words on the outbound channel and wherein the probability of collisions on the inbound channel due to bit errors is reduced by means which requires the remote terminals to sample m busy bits and sense that the inbound channel is not busy only when all such sampled busy bits so indicate.

8. A data communication system in accordance with claim 2 wherein maximum access delay to the inbound channel is optimized for periodic messages by means limiting the maximum length of aperiodic messages to one minor frame or less.

9. In a data communications system having inbound and outbound communication channels on which a central station and a plurality of remote terminal units operate, a method for selectively controlling the system remote terminal units by a slotted CSMA technique, comprising the step of:
dividing the inbound channel into a plurality of standardized microslots of a given duration and utilizing the outbound channel to convey inbound channel busy status information; and
prioritizing access to the inbound channel by the remote units when transmitting periodic and aperiodic messages thereon,
permitting remote units to transmit periodic messages at the start of the first microslot after the inbound channel is sensed not busy, but aperiodic messages only after waiting an additional one microslot to determine the inbound channel remains not busy.

10. A method for controlling a data communication system in accordance with claim 9 which includes the further step of utilizing a given number of said microslots to form a respective minor frame and a given number of such minor frames to form a respective major frame.

11. A method for controlling a data communication system in accordance with claim 10 wherein prioritizing channel access includes the further step of granting sole use of a selected minor frame to a requesting remote terminal for the duration of an on-going periodic message.

12. A method for controlling a data communication system in accordance with claim 11 wherein the request for channel access by a remote terminal to transmit a periodic message is made by an aperiodic data message over inbound channel and which is granted by a similar aperiodic message for the outbound channel.

13. A method for controlling a data communication system in accordance with claim 10 wherein the step of prioritizing channel access includes the steps of automatically indicating said inbound channel is busy two microslots prior to the assigned minor frame so as to prevent unwanted acquisition by a radio data terminal transmitting an aperiodic message.

14. A method for controlling a data communication system in accordance with claim 9 which further includes the step of synchronizing the remote terminal to the start of an inbound microslot and aligning frame synchronization of outbound messages with inbound microslots and requiring said remote terminal to synchronize to these sequences and maintain internal timing reference to said sequences.

15. A method for controlling a data communication system in accordance with claim 10 wherein busy bits are interspersed with data words on the outbound channel to indicate inbound channel busy station and wherein the probability of collisions on the inbound channel due to bit errors may be reduced by requiring the remote terminals to sample m busy bits and sense that the inbound channel is not busy only when all such sampled busy bits so indicate.

16. A method for controlling a data communication system in accordance with claim 10 wherein maximum access delay to the inbound channel is optimized for periodic messages by the further step of limiting the maximum length of aperiodic messages to one minor frame or less.

* * * * *